No. 12,382.

REISSUED AUG. 22, 1905.

G. L. CORCORAN & G. A. DOBYNE.

THREAD MEASURING MECHANISM FOR SEWING MACHINES.

APPLICATION FILED MAY 22, 1905.

3 SHEETS—SHEET 1.

Witnesses:
G. A. Pennington
H. J. Fletcher.

Inventors:
George L. Corcoran,
George A. Dobyne,
by Burkewell & Corcoran
Attys.

No. 12,382.

REISSUED AUG. 22, 1905.

G. L. CORCORAN & G. A. DOBYNE.

THREAD MEASURING MECHANISM FOR SEWING MACHINES.

APPLICATION FILED MAY 22, 1905.

3 SHEETS—SHEET 2.

Witnesses:
G. A. Pennington
H. J. Fletcher.

Inventors:
George L. Corcoran,
George A. Dobyne,
by Bakewell & Cornwall
Attys.

No. 12,382. REISSUED AUG. 22, 1905.
G. L. CORCORAN & G. A. DOBYNE.
THREAD MEASURING MECHANISM FOR SEWING MACHINES.
APPLICATION FILED MAY 22, 1905.
3 SHEETS—SHEET 3.
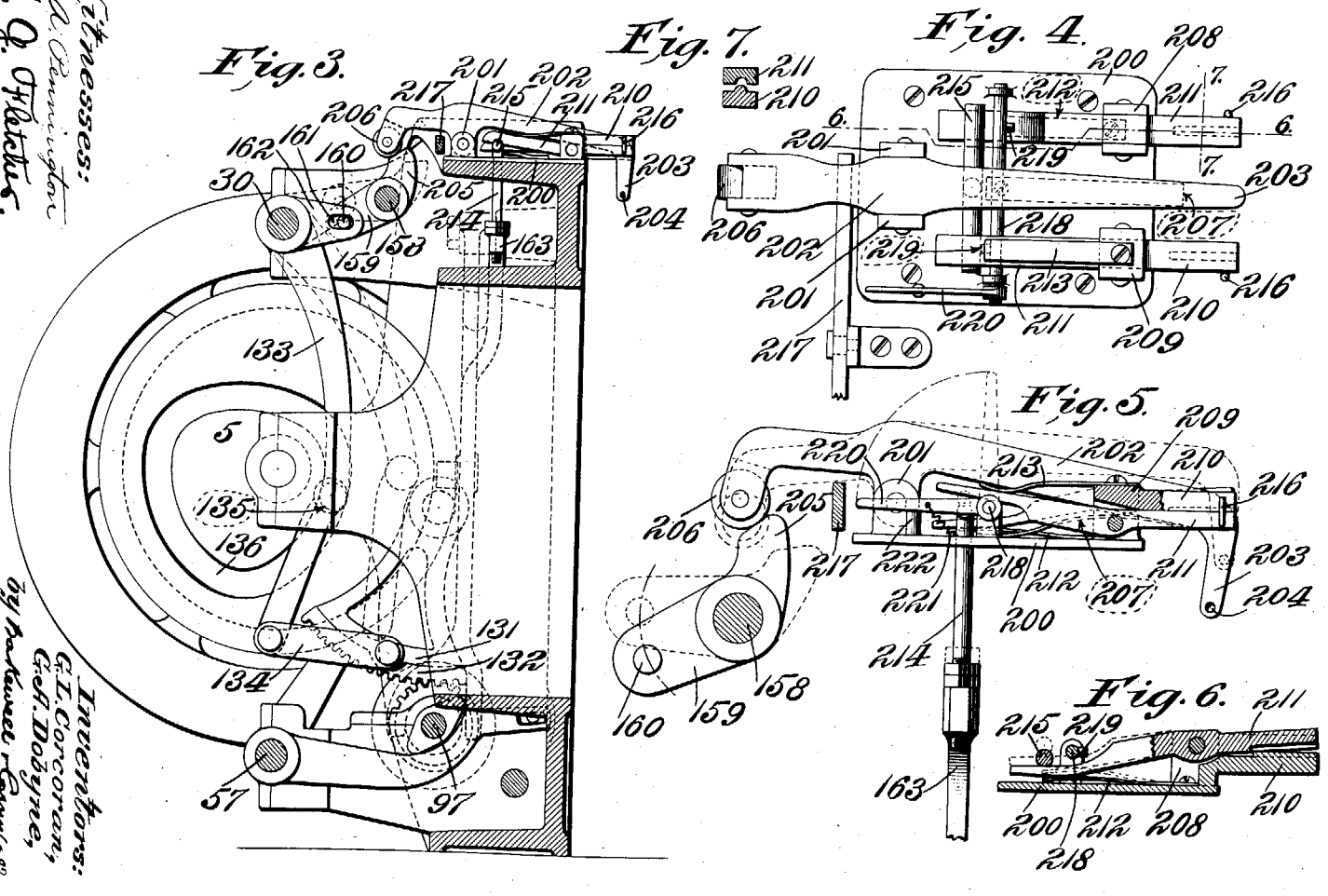
Witnesses:
G. A. Pennington
H. J. Fletcher.
Inventors:
G. L. Corcoran,
G. A. Dobyne,
by Bakewell & Lemm
Attys.

UNITED STATES PATENT OFFICE.

GEORGE L. CORCORAN AND GEORGE A. DOBYNE, OF ST. LOUIS, MISSOURI, ASSIGNORS, BY DIRECT AND MESNE ASSIGNMENTS, TO CHAMPION SHOE MACHINERY COMPANY, OF ST. LOUIS, MISSOURI, A CORPORATION OF MISSOURI.

THREAD-MEASURING MECHANISM FOR SEWING-MACHINES.

No. 12,382. Specification of Reissued Letters Patent. Reissued Aug. 22, 1905.

Original No. 751,264, dated February 2, 1904. Application for reissue filed May 22, 1905. Serial No. 261,717.

*To all whom it may concern:*

Be it known that we, GEORGE L. CORCORAN and GEORGE A. DOBYNE, citizens of the United States, residing at St. Louis, Missouri, have jointly invented a certain new and useful Improvement in Thread-Measuring Mechanism, of which the following is a full, clear, and exact description, such as will enable others skilled in the art to which it appertains to make and use the same, reference being had to the accompanying drawings, forming part of this specification, in which—

Figure 1:
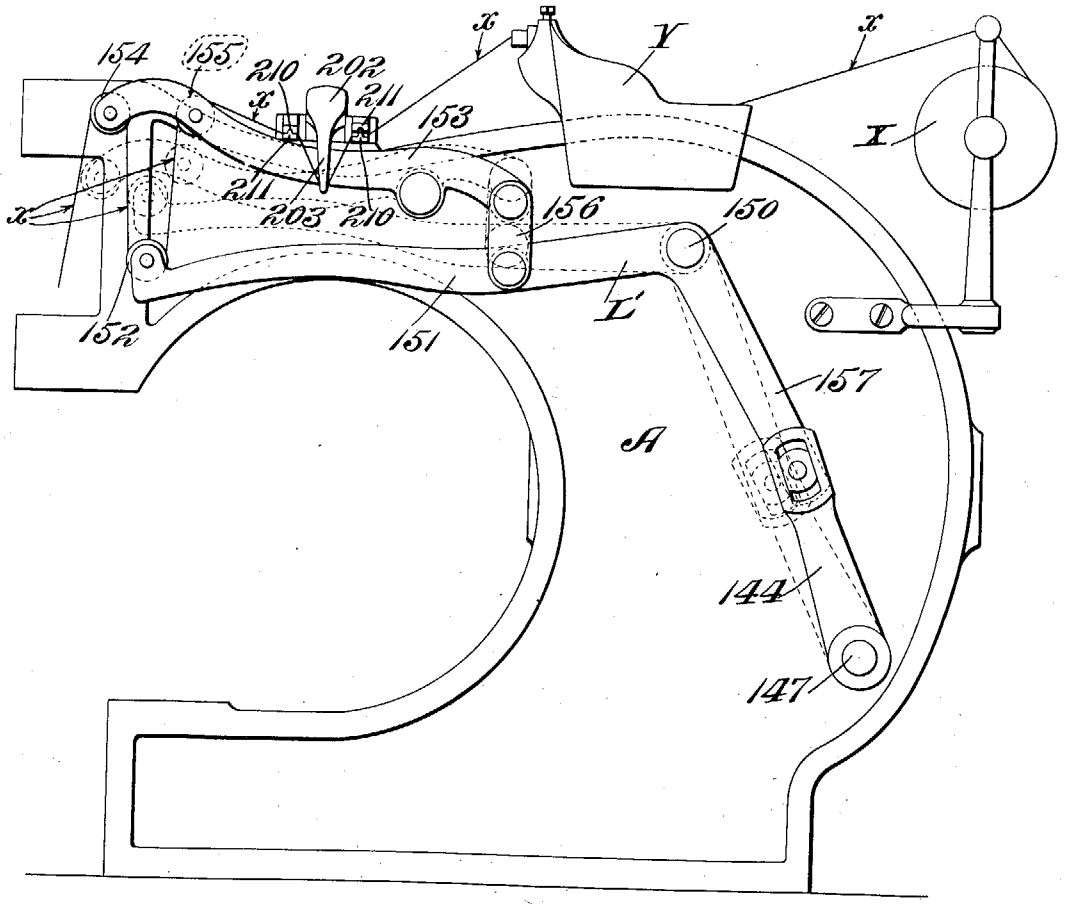
Figure 2:
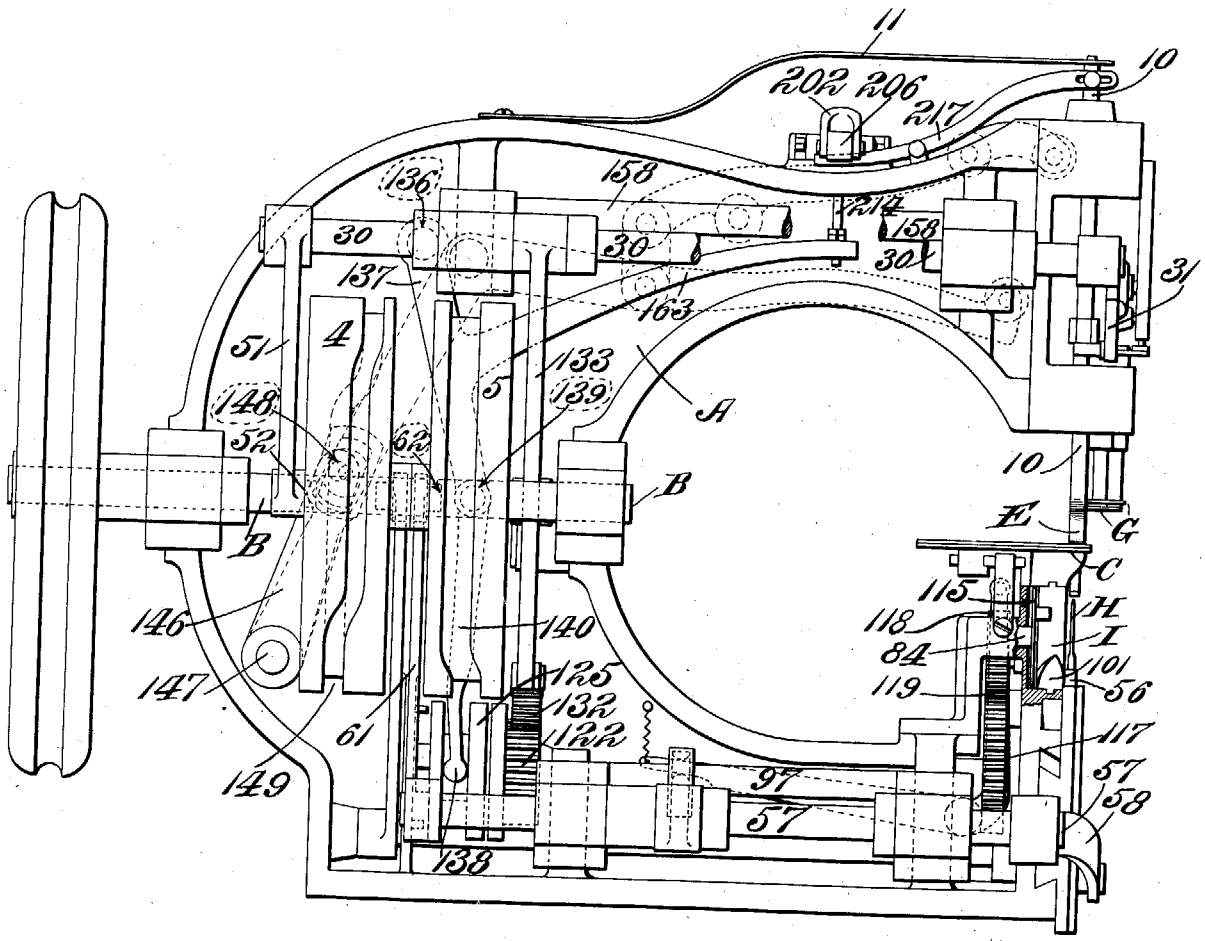

Figure 1 is a view of one side of a sewing-machine to which the present invention is applied. Fig. 2 is a view of the other side of such sewing-machine, said view being partly in section and certain of the parts being broken away. Fig. 3 is an elevation, partly in section, at right angles to the two preceding views and looking from the head of the machine. Fig. 4 is a top plan view of the thread-measuring mechanism *per se*. Fig. 5 is a side elevation of the same, partly in section. Fig. 6 is a detail elevation, partly in section, on about the line 6 6 of Fig. 4; and Fig. 7 is a detail transverse elevation on about the line 7 7 of Fig. 4.

This invention relates to improvements in thread-measuring mechanisms, being particularly applicable to use upon sewing-machines, our primary object being to provide a simple and efficient mechanism by means of which the amount of thread measured off for a stitch can be determined and controlled by the thickness of the work being operated upon.

To this end and also to improve generally upon mechanisms of the character indicated the invention consists in the various matters hereinafter described and claimed.

The invention is of course applicable to many types of sewing-machines; but it is herein illustrated as applied to a sewing-machine invented by us and forming the subject-matter of Letters Patent No. 760,732, dated May 24, 1904.

The sewing-machine above referred to and illustrated in the accompanying drawings embodies a supporting-standard A, upon which is suitably journaled the driving-shaft B.

C is the work-table.

E is the presser-foot.

H is the needle, and I is the shuttle.

The presser-foot is carried by the presser-bar 10, which is normally forced into engagement with the work by a suitable spring 11. Upon the driving-shaft are cam-disks 4 and 5, by means of which power is transmitted to the operative elements of the machine.

The needle is supported upon a bar or plate 56, adapted to reciprocate vertically in suitable guides, and movement is imparted to said needle-bar by means of a rock-arm 58 upon a rock-shaft 57, suitably journaled upon the standard A. Rocking motion is transmitted to the said rock-shaft from the cam 5 through a rock-arm 61, which is connected to the rear of said shaft and has at its free end a cam-roll 62, received in a suitable cam-groove in said disk.

The rotary shuttle I, having the usual point or beak 101, is in driving connection with a driving-plate 115, mounted upon a shaft 84, which also carries a gear 118, connected, through the gear 119, to a gear 117 upon a rotatable shaft 97. Loosely mounted upon said shaft 97 to permit rotation thereon is a gear 122, and slidable upon said shaft, but non-rotatably mounted thereon, is a clutch-sleeve 125, which in one of its positions is adapted to operatively connect the said shaft 97 and the said gear 122 and in the other of its positions to disconnect said elements, and thus permit said gear to rotate freely upon the said shaft. A lever 137, which is suitably pivoted upon the standard A, as by means of the stud 136, has its lower free end 138 in engagement with the clutch-sleeve 125 to move the latter longitudinally along said shaft 97, and a cam-roll 139 upon said lever is received in a suitable cam-groove 140 in the periphery of the said cam-disk 5. The suitably-pivoted rocking plate 131 is provided with a segmental gear 132, which meshes with the before-mentioned driving-gear 122, and a lever 133, pivoted upon the rock-shaft 30, is connected to said rocking plate, as by means of the link 134, said lever being provided with a cam-roll 135, which enters the cam-groove 136 in said cam block or disk 5.

The rock-shaft 30 is provided with a rock-arm 51, which carries a cam-roll 52, received in a suitable cam-groove in the cam-block 4, and through suitable connections, including the rock-arm 31, mounted upon said rock-shaft 30, but immaterial so far as the present invention is concerned, said rock-shaft imparts the proper movement to thread-laying devices G, which operate to lay the thread about the needle.

Such is the general construction of the sewing-machine to which the present invention is herein illustrated as applied. As to the operation of such machine it is only necessary to say that when motion is imparted to the driving-shaft B and its cam-blocks 4 and 5 are rotated the needle H is elevated to cause the same to pass through the work. The thread-laying devices G then place the thread in the barb of the needle, the needle recedes to carry the loop through the work, the shuttle then rotates, its point 101 enters the loop, and the loop is carried around by the shuttle and is liberated therefrom, the shuttle coming to rest in its initial position after it has carried the loop about the shuttle-thread in a manner which will be readily apparent. The operation of the shuttle is effected by the driving-gear 122 and the clutch 125, the clutch connecting said driving-gear and shuttle during what may be termed the "forward" movement of the gear 122, so that the driving of the shuttle is caused and said clutch being thrown to disconnect said driving-gear and the shaft 97 after the shuttle has been carried through a single rotation in order to permit the free backward movement of the driving-gear 122 upon said shaft 97.

The take-up L′ herein illustrated includes a bell-crank lever pivoted to the standard A at 150, the substantially horizontal arm 151 of said lever having a suitable thread-guide, such as the roller 152, at its free end. A second lever 153, pivoted to the standard A intermediate its ends, has two thread-guides, such as the rollers 154 and 155, upon one arm, and has its other arm connected, as through the link 156, with said arm 151 of the before-mentioned bell-crank lever. A rock-shaft 147, extending through the standard A, has a rock-arm 144 upon one side of said standard, said arm being connected to the arm 157 of the before-mentioned bell-crank lever, and upon the other side of the standard A said rock-shaft 147 is provided with a second rock-arm 146, which has a cam-roll 148, received in a cam-groove 149 in the periphery of the before-mentioned cam-disk 4.

X indicates the spool of thread, $x$ the thread fed from said spool and operated upon by the needle in the operation of the machine, and Y indicates a wax-pot.

In threading the machine the thread is passed over the thread-roll 155, then under the thread-roll 152, then over the thread-roll 154, whence it is led to the thread-laying devices G. It will be readily apparent that as the cam-block 4 rotates the bell-crank lever, including the arm 151 and the lever 153, are both rocked upon their pivots, so that the thread-carrying ends of the lever-arms alternately approach and recede from each other, the thread being slackened when said arms approach each other (in order to permit the thread to be fed to the stitch-forming mechanism) and the thread being tightened or taken up as the said arms recede from each other, such taking up of the thread of course taking place after the shuttle has carried the loop about the shuttle-thread in order to tighten the stitch, as is well understood.

Such being the general construction of the sewing-machine and of the take-up mechanism, in connection with which the present thread-measuring mechanism is herein illustrated, the construction and operation of said thread-measuring mechanism itself is now to be considered.

Suitably mounted upon the standard A, intermediate the thread-supply X and the thread-carrying end of the take-up lever 153, is a base-plate 200, and standards or pivot-ears 201 rise from what may be termed the "rear" of said base-plate, the thread-measuring lever 202 being pivoted between said ears and extending both forwardly and backwardly from the pivot. The forward end of said lever is provided with a downturned nose or finger 203, which has a thread-eye 204 in its lower end, while the rear arm of the lever is adapted to be engaged by a rock-arm 205 and for this purpose is preferably bent downwardly and provided with the roller 206. A spring 207, suitably fastened to the base-plate 200, bears at its free end against the under side of the forward arm of the lever, and thus tends to hold said forward arm in elevated position.

Rising from the forward edge of the base-plate 200 and having the lever 202 located between them are posts 208 and 209, each of said posts having a forwardly-extending projection 210, which forms one jaw of a thread-clamp. The post 208 is bifurcated or slotted above its thread-jaw 210, and the post 209 is slotted below its thread-jaw, a lever 211 being received in each of said slots or bifurcations and pivoted to the posts. The forward arm of each of said levers forms a jaw coöperating with the jaw 210, whereby a thread-clamp is produced upon each side of the measuring-lever 202. Preferably the jaws of the clamps are of a cross-section (shown in Fig. 7) in order that the thread can be firmly engaged. Springs 212 and 213, connected, respectively, to the base-plate 200 and the post 209, have their free ends engaging the respective levers 211 and tend to force the movable jaws of the thread-clamps into clamping position, the respective jaws moving oppositely into such clamping position. Vertically slidable through the supporting-base 200, and also through the appropriate portion of the machine-standard A is a rod 214, whose upper end carries a cross-bar 215, which extends across what may be termed the "inner" arms of the lever 211—*i. e.*, the arms of said levers which do not act as jaws of the thread-clamps, said cross-bar lying above the inner arm of the lever supported upon the post 208 and lying below the inner arm of the lever supported upon the post 209. It will thus be apparent that when said rod 214 is elevated the lever 211 upon the post 209 is moved to cause its clamping-jaw to open, and the lever 211 upon the post 208 is relieved of pressure by the cross-bar, so that the spring 212 can act upon said lever to force its jaw into clamping position. When the rod 214 is lowered, the reverse action follows—*i. e.*, the cross-bar 215 serves to open the clamp upon one side of the thread-measuring lever and the spring 213 operates to close the clamp on the other side thereof. For convenience the clamp extending from the post 208 and nearer the wax-pot will hereinafter be referred to as the "outer" clamp, while the clamp extending from the post 209 will hereinafter be referred to as the "inner" clamp.

Suitably journaled upon the machine-standard A is a rock-shaft 158, which is provided with the before-mentioned rock-arm 205 and also with a rock-arm 159, and this rock-arm 159 has a pin 160, which is received in an elongated slot 161 in a rock-arm 162 upon the before-mentioned rock-shaft 30. It will be readily apparent that as the rock-shaft 30 rocks in one direction the rock-arm 205 engages the roller 206 and rocks the lever 202, so that the nose or finger 203 is depressed, and that as the rock-shaft 30 rocks in the opposite direction the rock-arm 205 recedes from the said roller 206 and the lever 202 is recovered by the before-mentioned spring 207. Extending from the before-mentioned lever 137, which operates the clutch 125, is an arm 163, to which the before-mentioned vertically-movable rod 214 is connected. Thus as the said lever 137 oscillates the said rod 214, with its carried cross-bar 215, is raised and lowered and the thread-clamps are respectively alternately opened and closed.

Thread from the source of supply is passed between the jaws of the outer clamp, then through the eye 204 in the nose of the thread-measuring lever 202, then between the jaws of the inner thread-clamp, then over the roller 155 upon the take-up lever 153, then under the roller 152 upon the arm 151 of the other take-up lever, then over the roller 154 upon the said take-up lever 153, and then to the thread-laying devices G. Preferably a small piece of wire 216 is connected to one of the jaws of each of the thread-clamps and extends across the space between said jaws in order to prevent the thread from slipping out of the clamps, the thread being received in each clamp between the thread-guard 216 and the post, to which the movable jaw of the clamp is pivoted. It will now be apparent that if the inner thread-clamp be closed and the outer thread-clamp be opened, as shown in Fig. 1, and the thread-carrying finger 203 of the thread-measuring lever 202 be caused to descend thread will be pulled from the source of supply by said thread-carrying finger, and it will also be apparent that if the outer thread-clamp be closed and the inner thread-clamp be opened and the thread-carrying finger 203 be permitted to ascend the thread measured off, as just explained, can be utilized by the stitch-forming mechanism or taken up by the take-up. Furthermore, it will be apparent that the amount of thread measured off by the thread-measuring lever 202 will be determined by the amount of downward movement of the thread-carrying finger 203.

In order to control the throw of the thread-measuring lever 202 and to proportion the same to the thickness of the work being operated upon, a stop-lever 217 is pivoted upon the machine-standard A and has one arm connected to the presser-bar 10, while its other arm extends under and in the path of travel of the rear end of the thread-measuring lever 202. If the presser-foot be upon thin work, and therefore only slightly elevated, the arresting-arm of the lever 217 will be but a short distance below the rear arm of the thread-measuring lever 202, so that when the rock-arm 205 recedes from the roller 206 the movement of the thread-measuring lever is arrested by the said arresting-arm of the lever 217 and the thread-measuring lever will be acted upon by the rock-arm 205 during only the latter portion of the next forward movement of said rock-arm. If, however, a thick piece of work is under the presser-foot, the arresting-arm of the lever 217 will be lowered in order to permit the rear arm of the thread-measuring lever to move through a greater distance before it is arrested, so that during the next forward movement of the rock-arm 205 the thread-measuring lever will be acted upon to a greater extent than it was acted upon by said rock-arm when the arresting-arm of the lever 217 was in a more elevated position. Therefore the amount of thread measured off by the present mechanism is automatically nicely proportioned to the thickness of the work being operated upon.

Considering now the operation of the present thread-measuring mechanism in connection with the operation of the stitch-forming mechanism of the sewing-machine, we will assume that the shuttle has made a revolution and has come to rest, that the inner thread-clamp is closed, that the outer thread-clamp is opened, and that the thread-measuring finger 203 is in elevated position. As the driving-shaft of the machine rotates the rock-shaft 30 is rocked and the thread-measuring finger 203 descends, thus stretching the thread between the source of supply and the closed inner thread-clamp, so that the desired quantity of thread for the next stitch is measured off, the take-up levers being extended during this operation. As the driving-shaft continues to rotate the stitch-forming mechanism operates in the formation of the new stitch, the outer thread-clamp closes, the inner thread-clamp opens, and the thread-measuring finger 203 rises, so that the thread can be paid out to the stitch-forming mechanism for use in the formation of the stitch, the take-up levers approaching each other at the desired times and then after the thread-loop has been carried around by the shuttle and while the inner thread-clamp is still open and the outer thread-clamp is closed said take-up levers moving away from each other to pull the thread taut between the work and the closed outer thread-clamp. The take-up device thus absorbs the thread which constituted the loop around the shuttle and also absorbs the thread which has been measured off by the movable part of the thread-measuring device, in addition to tightening the stitch. The act of tightening the stitch makes the thread between the outer clamp and the stitch taut, and thus there is no possibility for the occurrence of what is known as a "backlash," because coincidently with the opening of the outer clamp the inner clamp is closed before the take-up device changes its position and before the movable part of the measuring device commences its stroke to draw from the source of supply the quantity of thread necessary for the next stitch. The relation between the take-up device and the measuring device is so timed that the thread is kept taut until the proper time in the formation of the stitch for it to be slackened, at which time the inner clamp is closed and the movable part of the measuring device is operative in paying off a quantity of thread, as predetermined by the presser-bar-controlled stop for the next stitch.

Mechanism is provided whereby both thread-clamps can be manually caused to simultaneously release the thread, so that the work can be taken from the machine by the operator. A rock-shaft 218, suitably journaled to the base 200, lies between the levers 211 at their inner ends in such position that normally the operation of said levers is not interfered with, and upon said rock-shaft are oppositely-extending projections 219, adapted when said shaft is rocked in one direction to engage both said levers and move their clamp-forming arms into open position. Said rock-shaft also has an operating-handle or rock-arm 220 under the control of the operator and is acted upon by a suitable recovering-spring 221, the movement of said shaft to normal or inoperative position being limited by a suitable stop 222.

We are aware that minor changes in the construction, arrangement, and combination of the several parts of our device can be made and substituted for those herein shown and described without in the least departing from the nature and principle of our invention.

Having thus described the invention, what is claimed as new, and desired to be secured by Letters Patent, is—

1. The combination with stitch-forming mechanism, of a thread-measuring mechanism including a thread-measuring device, thread-clamps upon opposite sides thereof, each of said clamps including a movable jaw, the said movable jaws being, with respect to each other, upon opposite sides of their coöperating jaws, and an actuating member connected to both of said movable jaws, whereby upon a given movement of said actuating member said movable jaws are oppositely actuated; substantially as described.

2. The combination with stitch-forming mechanism, of a thread-measuring mechanism including a thread-measuring device, thread-clamps upon opposite sides thereof, each of said clamps including a movable jaw, and an actuating member having engagement with opposite sides of said respective jaws; substantially as described.

3. The combination with stitch-forming mechanism, of a thread-measuring mechanism including a thread-measuring device, thread-clamps upon opposite sides thereof, each of said clamps including a movable jaw, an actuating device engaging one side of one of said movable jaws and the opposite side of the other thereof, and springs acting upon each of said movable jaws in opposition to said actuating device; substantially as described.

4. The combination with stitch-forming mechanism, of a thread-measuring mechanism including a thread-measuring device, thread-clamps upon opposite sides thereof, each of said clamps including a movable jaw, a reciprocatory rod, and a cross-bar upon said rod and engaging opposite sides of the respective said movable jaws; substantially as described.

5. The combination with stitch-forming mechanism, of a thread-measuring mechanism including a thread-measuring device, posts upon opposite sides thereof, a clamp-jaw upon each of said posts, a movable clamp-jaw pivoted upon each of said posts, and an actuating device engaging opposite sides of said movable clamp-jaws; substantially as described.

6. The combination with stitch-forming mechanism, of a thread-measuring mechanism including a thread-measuring device, posts upon opposite sides thereof, a clamp-jaw upon each of said posts, a lever pivoted upon each of said posts and having one of its arms coöperating with the said clamp-jaw upon said post, an actuating member engaging opposite sides of the other arms of said levers, and a spring acting upon each of said levers in opposition to said actuating device; substantially as described.

7. The combination with stitch-forming mechanism, of a thread-measuring mechanism including thread-supports, a movable thread-engaging device intermediate said supports and movable across the line of the thread between said supports, means for moving said thread-engaging device toward and away from the thread between said supports and across the line of said thread, and an adjustable stop in the path of movement of said thread-engaging device as it moves away from said thread; substantially as described.

8. The combination with a sewing-machine including a needle, a shuttle, thread-laying devices, a shaft and mechanism for actuating said shuttle and including a clutch and a lever for throwing the same, of thread-measuring mechanism including a movable thread-engaging device and thread-holding devices, operative connection between said thread-engaging device and said lever, operative connection between said shaft and said thread-holding devices, and operative connection between said shaft and said thread-laying devices; substantially as described.

9. The combination with a sewing-machine including thread-laying devices for laying the thread about the needle, a needle, complementary stitch-forming mechanism, and a rock-shaft for actuating said thread-laying devices, of a thread-measuring mechanism including a movable thread-engaging device, and a rock-arm upon said rock-shaft and adapted to operate said thread-engaging device; substantially as described.

10. The combination with a sewing-machine including a shuttle, complementary stitch-forming mechanism, and shuttle-actuating mechanism including a clutch and a lever for operating the same, of a thread-measuring mechanism including thread-holding devices, and operative connection between said lever and said thread-holding devices; substantially as described.

11. The combination with a sewing-machine including a shuttle, complementary stitch-forming mechanism, and driving mechanism for said shuttle including a clutch and a lever for operating the same, of thread-measuring mechanism including thread-holding devices, an arm upon said lever, and operative connection between said arm and said thread-holding devices; substantially as described.

12. The combination with stitch-forming mechanism, of a thread-measuring mechanism including the combination with a plurality of thread-clamps, of actuating mechanism therefor, means whereby in the operation of said mechanism the thread is at all times engaged by one or the other of said clamps, and means for manually throwing said clamps into open position; substantially as described.

13. The combination with stitch-forming mechanism, of a thread-measuring mechanism including the combination with thread-clamps each of which includes a movable jaw carried by a lever, of a rock-shaft between the arms of said respective levers and adapted to be manually operated, and projections upon said rock-shaft adapted respectively to engage said respective levers; substantially as described.

14. In a sewing-machine, the combination with a stitch-forming mechanism including a take-up device for the shuttle-loop and a thread-measuring device comprising a movable part, a stop for determining the amount of movement of said movable part, a presser-bar connected to said stop for controlling the position thereof, two clamps arranged on each side of said movable part, and means for alternately opening and closing said clamps; substantially as described.

15. In a sewing-machine, the combination with a stitch-forming mechanism including a take-up device for absorbing the loop of thread passing around the shuttle and tightening the stitch, a thread-measuring device comprising two clamps which are alternately opened and closed, a movable part operating between said clamps, said movable part drawing off the thread from the spool at a time when the clamp therebetween and said spool is opened, at which time the companion clamp is closed and the take-up device slackens the thread to form the loop around the shuttle, a stop for determining the amount of movement of said movable part, a presser-bar connected to said stop for controlling the position thereof, and means for closing said clamp and for opening the companion clamp to permit the take-up to absorb the shuttle-loop and the portion of the thread measured off; substantially as described.

16. In a sewing-machine, the combination with a stitch-forming mechanism including a take-up device for absorbing the loop of thread passing around the shuttle and tightening the stitch, and a thread-measuring device comprising two clamps, means for alternately opening and closing said clamps, a movable part operating between said clamps, a stop for determining the amount of movement of said movable part, a presser-bar connected to said stop for controlling the position thereof, and means for moving said part so as to cause the thread to be slackened between the clamps coincidently with the slackening of the thread by the take-up device to form the loop around the shuttle, said means causing said movable part to recede and render the slackened thread between the clamps available to the take-up device when the shuttle-loop is absorbed and the stitch is tightened; substantially as described.

17. In a sewing-machine, the combination with a stitch-forming mechanism including a take-up device for absorbing the shuttle-loop, and a thread-measuring device comprising a movable part, means for vibrating said movable part, a stop for determining the amount of movement of said movable part, a presser-bar connected to said stop for controlling the position thereof, a thread-clamp on each side of said movable part, and means for alternately opening and closing said clamps whereby when the movable part measures off the thread from the source of supply the clamp between said movable part and said source of supply is opened, and when said movable part recedes from its measuring position the first-mentioned clamp is closed and the clamp between said movable part and the take-up device is opened, at which time the take-up device is absorbing the loop around the shuttle, the measured-off portion of the thread, and tightening the stitch; substantially as described.

18. In a sewing-machine, the combination with a stitch-forming mechanism including a take-up device for the shuttle-loop, a thread-measuring device comprising a movable part, means for operating said movable part, a thread-clamp arranged on each side of said movable part, means for alternately opening and closing said clamps, a presser-bar, and a stop whose position is determined by said presser-bar for controlling the movement of the movable part of the thread-measuring device; substantially as described.

19. In a sewing-machine, the combination with a stitch-forming mechanism including a take-up device, a thread-measuring device comprising a movable part, means for vibrating said movable part, a clamp on each side of said movable part, means for alternately opening and closing said clamps, a presser-bar, a stop for controlling the receding stroke of the movable part of the thread-measuring device, and a connection between said stop and said presser-bar; substantially as described.

20. In a sewing-machine, the combination with a stitch-forming mechanism including a take-up device, a thread-measuring device comprising two stationarily-mounted clamps, means for alternately opening and closing said clamps, a movable part operating between said clamps, a stop for determining the amount of movement of said movable part, and a presser-bar connected to said stop for controlling the position thereof; substantially as described.

In testimony whereof we hereunto affix our signatures, in the presence of two witnesses, this 17th day of May, 1905.

GEORGE L. CORCORAN.
GEORGE A. DOBYNE.

Witnesses:
F. R. CORNWALL,
GEORGE BAKEWELL.